United States Patent
Roberge et al.

(10) Patent No.: US 6,845,658 B2
(45) Date of Patent: Jan. 25, 2005

(54) DEVICE FOR ANGULAR POSITIONING OF AN INCIDENCE PROBE ON A WALL, OF THE TYPE COMPRISING OF A WEATHER VANE THAT CAN MOVE ABOUT AN AXIS, PARTICULARLY ON A WALL OF AN AIRCRAFT

(75) Inventors: Philippe Roberge, Issy les Moulineaux (FR); Bernard Christin, Mazage (FR); Alain Subtil, St Ouen (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 10/168,867

(22) PCT Filed: Dec. 28, 2000

(86) PCT No.: PCT/FR00/03719

§ 371 (c)(1),
(2), (4) Date: Jun. 26, 2002

(87) PCT Pub. No.: WO01/50136

PCT Pub. Date: Jul. 12, 2001

(65) Prior Publication Data

US 2002/0189340 A1 Dec. 19, 2002

(30) Foreign Application Priority Data

Dec. 30, 1999 (FR) .............................................. 99 16773

(51) Int. Cl.[7] .............................................. A63B 53/00
(52) U.S. Cl. .................................. 73/170.01; 73/170.02
(58) Field of Search ........................ 73/170.01–170.15, 73/180, 186, 170.16, 866.5

(56) References Cited

U.S. PATENT DOCUMENTS

| 4,646,011 A | * | 2/1987 | Wallrafen | ............... | 324/207.25 |
| 5,361,633 A | | 11/1994 | Peet, II | | |
| 5,742,160 A | * | 4/1998 | Bergstedt et al. | ...... | 324/207.25 |

FOREIGN PATENT DOCUMENTS

DE        19 27 355        12/1969

* cited by examiner

Primary Examiner—Edward Lefkowitz
Assistant Examiner—Jermaine Jenkins
(74) Attorney, Agent, or Firm—Oblon, Spivak, McClelland, Maier & Neustadt, P.C.

(57) ABSTRACT

A device for the in situ angular positioning of an incidence probe, e.g., of the weather vane type, equipped with a vane and mounted, e.g., on an airplane. According to the device, the axis of rotation of the probe is used directly as a positioning reference. The angular-positioning device include a fixed structure secured to the wall of the airplane, of annular shape and including a circular track for a moving slider. The vane is immobilized in an enveloping structure. A coupling member coupling the slider and the enveloping structure is fixed to the enveloping structure. Coupling is afforded by a flat spring leaf including a stud at its end. The stud is slipped into a slit of the slider, which allows the vane to be driven about its axis of rotation. The position is measured using a digital inclinometer.

16 Claims, 6 Drawing Sheets

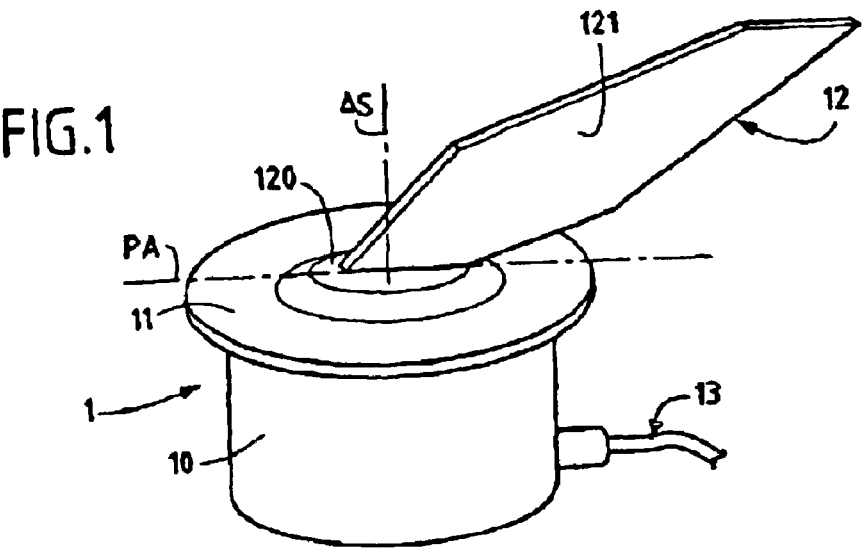

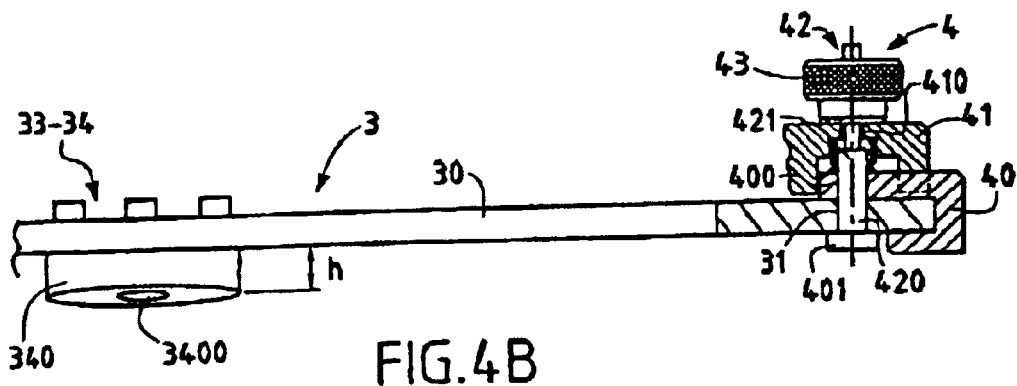
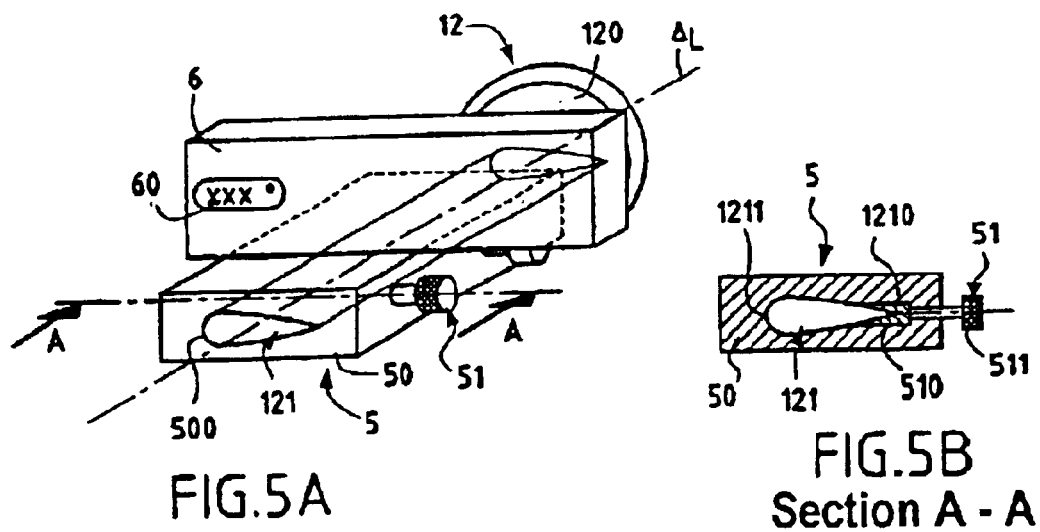
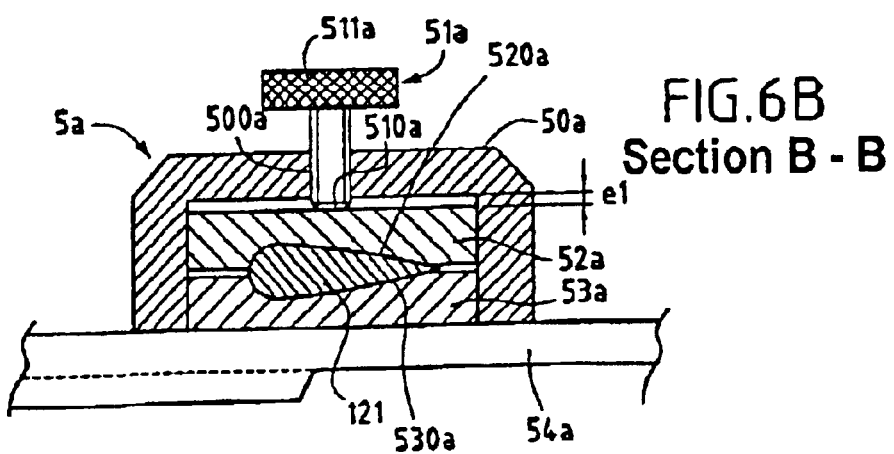

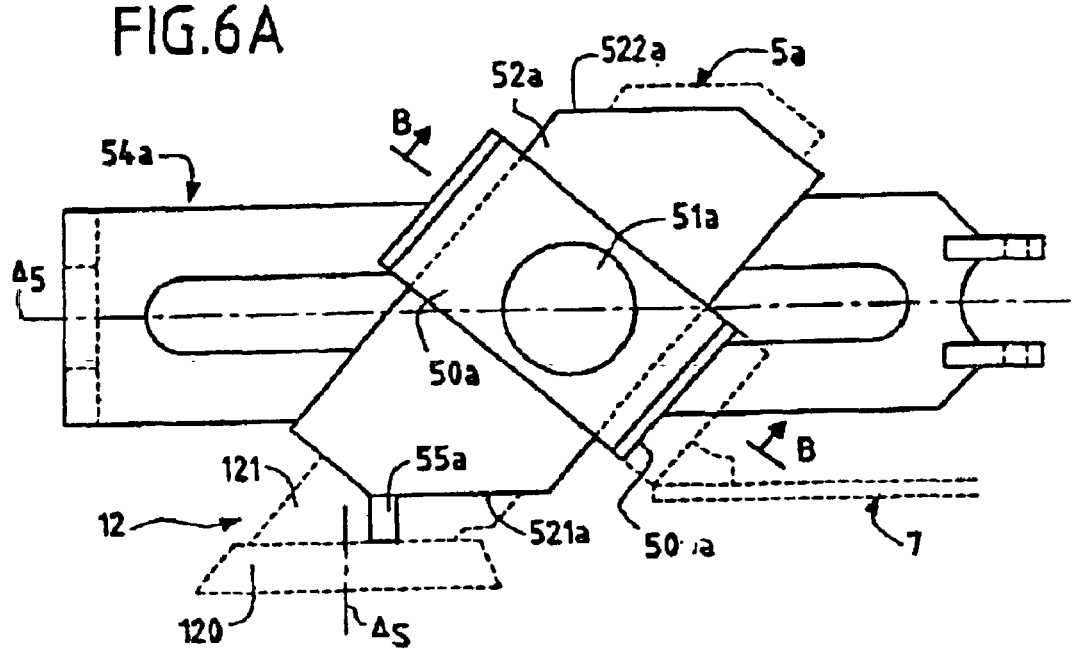
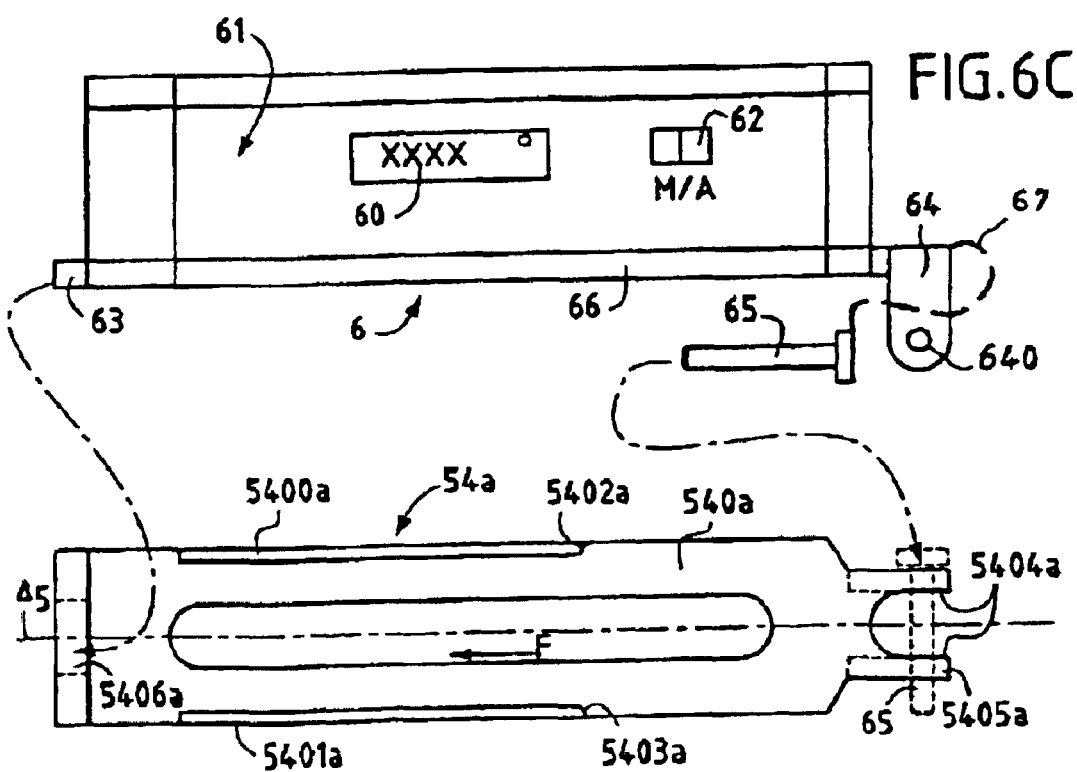

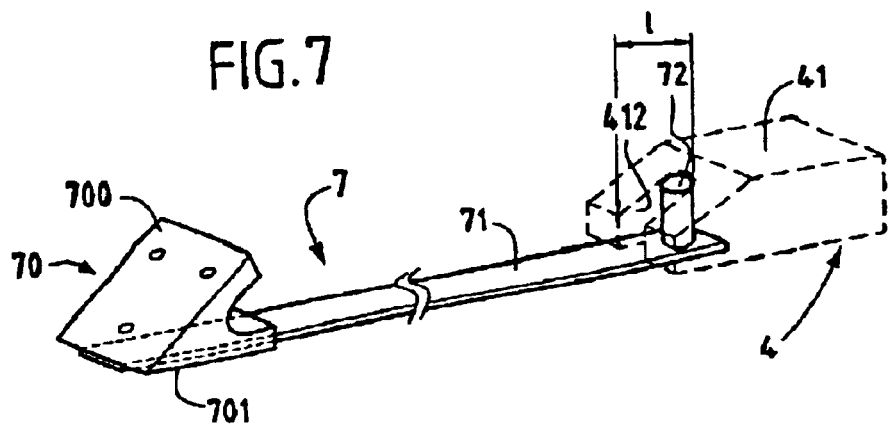
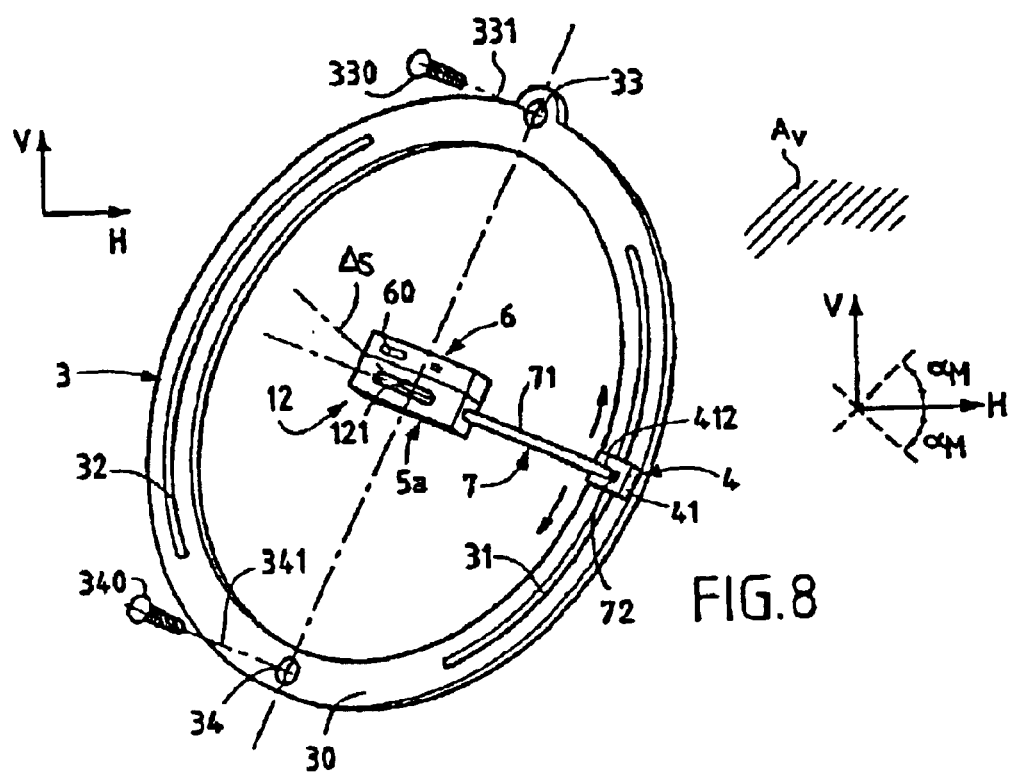
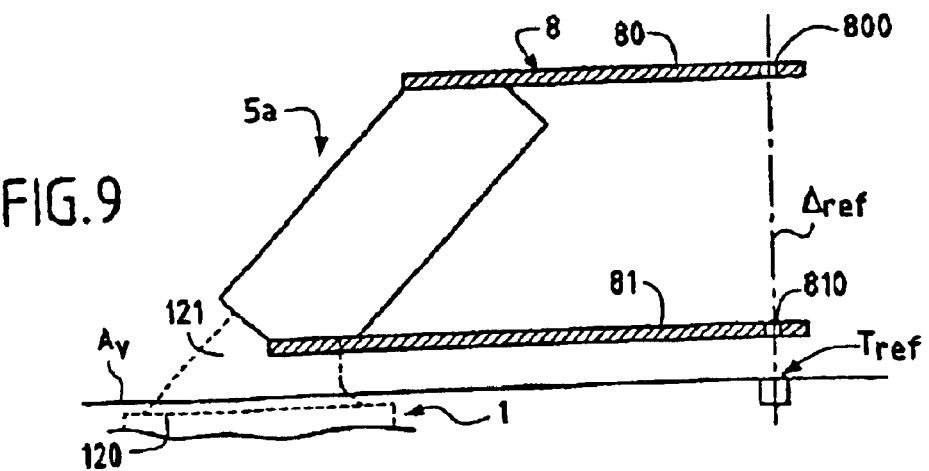

DEVICE FOR ANGULAR POSITIONING OF AN INCIDENCE PROBE ON A WALL, OF THE TYPE COMPRISING OF A WEATHER VANE THAT CAN MOVE ABOUT AN AXIS, PARTICULARLY ON A WALL OF AN AIRCRAFT

The invention relates to a device for the precise and in situ positioning of an incidence probe on a wall, of the type comprising a weather vane which can move about an axis.

The invention applies preferably, although not exclusively, to incidence probes mounted on aircraft. Thus, in that which follows, in order to provide a material focus and without this in any way restricting the scope of the invention, we shall consider the context of the preferred application.

In the context of the invention, and more particularly of the above preferred application, the term "aircraft" is to be understood in its broadest sense. It naturally relates to airplanes of all types, but also relates to other flying machines and, in particular, to helicopters. In that which follows below, with a view to simplifying and without this in any way restricting the scope of the invention, we shall consider the context of the preferred application and simply use the word "airplane".

There are generally two incidence probes fixed to the nacelle, at approximately 3 o'clock and 9 o'clock respectively with respect to the longitudinal axis of the airplane. They need to be situated as close as possible to the nose of the airplane, so that the weather vane is acted upon by a stream of air which is not yet disturbed, or which has been disturbed as little as possible.

Although other physical principles may be used, most incidence probes mounted on airplanes are of the type known as the weather vane type based on being driven by air flowing along the walls of the nacelle of the airplane and exerting pressure on a part known as the vane, able to rotate about an axis substantially perpendicular to the wall.

FIG. 1, placed at the end of this description, schematically illustrates the overall structure of such an incidence probe.

The probe 1 comprises a main body consisting of a casing 10, generally cylindrical, closed at its upper part by a plate 11, advantageously circular. The weather vane 12 comprises a lower support 120, of small thickness and able to move about an axis $A_s$, which will be known as the probe axis, surmounted by a vane 121.

The shape and the profile of the cross section of this vane 121 are determined by the final application of the probe, that is to say essentially by the type of airplane for which it is intended, the degree of precision on the angular measurements to be obtained, and a certain number of physical parameters that describe the environmental conditions to which the incidence probe is subjected: maximum speed achieved by the airplane, therefore also of the air flowing along the walls of the nacelle, maximum temperature variations, etc., these considerations departing from the precise context of the invention. What happens is that the positioning device that is the subject of the invention, and this is one of its advantages, remains compatible with all types of vane-type probe of the known art and requires no modification, either structural or functional.

The casing in particular contains a sensor that senses the angle of rotation of the weather vane 12, and more specifically of the vane, about the axis $A_s$. The latter may call upon a measurement based on the use of a potentiometer, the axis of which is driven by the turning of the vane 121, of a sensor of the "resolver" type or any other sensor of the known art suited to this field of application. The amplitude of the rotation of the weather vane 12 about the axis $A_s$ is converted into electrical signals, transmitted by links 13 to a signal processing apparatus (not depicted) situated inside the airplane, generally in the cockpit, where it is finally displayed on an on-board instrument in an appropriate form, depending on the parameters measured.

The casing 10 of the incidence probe is arranged in an orifice (not depicted) provided for that purpose in the nacelle of the airplane and covered by a cover (not depicted) so that that which is known as the "skin" of the airplane, referenced PA, lies flush with the upper surface of the support 120 of the vane 121. This is because it is necessary that, with the exception of the protrusion formed by the vane 121, there should be no other roughness which would disrupt the flow of the airstreams at the surface of this skin PA.

It will be readily understood that, during periodic maintenance and routine checks, the airlines would want to be able to test for correct operation and to certify the preciseness of the measurement signals supplied by the incidence probes, without having to remove them, that is to say to demount them, extract them from their housing, then mount then again after testing, as this would represent lengthy and expensive operations. Furthermore, it should be recalled, on the one hand, that the required precision on the measurements is very high: typically a few tenths of a degree, and that, on the other hand, the environmental conditions to which the incidence probes are subjected are extreme.

Furthermore, when the local skin of the airplane, which is often the case, has to have no roughnesses, the possibilities of constantly having available members for positioning the weather vanes and for measuring the preciseness of the information acquired by the on-board instruments are very limited, if not practically non-existent.

In the known art, use is fairly generally made of a test tool allowing the weather vane 12 (FIG. 1), and more particularly its vane 121, to be set, in situ, in spatial positions which vary with respect to a reference axis of this tool. This tool 2 is depicted in FIG. 2 attached to this description.

The tool 2 comprises a mounting plate 20 with a graduated scale 210, in a region that will be termed arbitrarily the upper region, and an orifice 200, in a region which will be termed the lower region, which orifice can be slipped over the vane 121 of the weather vane 12. The mounting plate 20 comprises members 201 and 202, for example screw members, for fixing to the airplane. To do this, the surface of the nacelle has tapped orifices (not depicted), in an appropriate spatial relationship with the fixing members 201 and 202, on the one hand, and with the axis of rotation $A_s$ of the vane 121 of the weather vane 12, on the other. Outside of test periods, these orifices are plugged so that they do not disrupt the local flow of the airstreams. Once the vane 121 has been slipped into the orifice 200, the mounting plate 20 is fixed on the airplane via the aforementioned members 200 and 201. The orifice 200 is a priori of circular shape and its axis of symmetry is theoretically coincident with the axis of symmetry of rotation $A_s$ of the vane 121 of the weather vane 12.

The mounting plate 20 also comprises a moving pointer 22, of which one of the ends, which will be termed arbitrarily the upper end, also has a graduated scale 220 and of which the other end, which will be termed the lower end, is secured to a ring 24 coaxial with the orifice 200. This ring 24, secured to the mounting plate 20, can move about an axis of rotation, which will be called the tool axis of rotation $A_o$, centered on the axis of symmetry of the orifice 200 and therefore also, in theory, on the axis of rotation $A_s$ of the vane 121.

The ring 24 supports, near the orifice 200 and on each side of an axis of symmetry of measurement $\Delta_M$, which will arbitrarily be termed vertical, $\Delta_v$, a pair 23 of jaw holders 230 and 231. The arrangement of these jaw holders 230 and 231 is such that the vane 121 can be introduced between them, more precisely between jaws 2300 and 2310. The first jaw 2300 is fixed and forms a spatial reference, when one of the faces of the vane 121 is pressing against this jaw 2300. The other jaw 2310 is able to move in translation along an axis perpendicular to the axis $\Delta_M$. It is pushed back by a spring 2311 arranged between its free end and the jaw holder 231. A thumbwheel 2312 allows the jaw 2300 to be pulled and the spring 2311 compressed. This operation allows the vane 121 to be placed between the two jaws, 2310 and 2300 and, after release, for it to be locked in a position pressing against the jaw 2300, which forms a reference, and allows it to be aligned with the measurement axis $\Delta_M$.

The scale 210 is graduated in degrees or in any other appropriate units of angle. In the example described, the scale is graduated from +50 to −50 degrees, on each side of the zero graduation mark. The central part, between +5 and −5 degrees, is graduated more precisely, in degrees. The scale 210 forms the main graduation scale. Likewise, the scale 220 carried by the rotating pointer 22, bears graduations on each side of the zero value (+10 to −10 in the example). This scale, which can be termed the secondary scale, acts like the vernier scale on a vernier caliper and makes it possible to determine fractions of graduation unit.

When the zeros of the two scales are aligned, the vane 121 of the weather vane 12 is aligned with the axis $\Delta_M$, which is supposed to define the absolute zero for the incidence probe. All that is then required is for a check to be made on the on-board instruments associated with -the incidence probe during the test to determine whether this zero is properly identified, and if not, for these instruments to be calibrated accordingly. Thereafter, all that is required is for the moving pointer 22 to be rotated about its axis $\Delta_o$, through predetermined increments, on each side of zero, which also turns the vane 121. These successive angles of rotation are read off on-board instruments, making it possible to determine the degree of precision in terms of linearity of the incidence probe 1.

This tool for positioning the vane of incidence probes, although very widely used, is not, however, free of drawbacks. The main drawback with this device is its low precision. Furthermore, there are essentially two sources of error.

The first source of error is due to the fact that the axis of rotation of the tooling $\Delta_o$ is not identical to the axis of rotation $\Delta_s$ of the vane 121 of the weather vane 12. Indeed, as has been recalled, these axes of symmetry are physically separate. Even if the initial positioning of the casing 10 (when mounting the probe 1 on the airplane) is performed with care, and the orifices intended for fixing the measurement tool 2 are made with high precision, the initial precision obtained initially degrades over time as a result of the stresses to which the surface of the nacelle is subjected. On the other hand, the method of fixing of the tool 2 does not allow high precision and/or good positional repeatability of the axis $\Delta_o$ with respect to the axis $\Delta_s$ and it then follows that, as a general rule, the two axes cannot be brought into coincidence with the desired precision.

The second main source of error is due to the fact that the reference taken on the vane 121 of the weather vane 12, achieved essentially by gripping between the two jaws 2300 and 2310 is a point reference, whereas the entirety of the profile of the vane plays a part in measuring an angle under actual operating conditions.

The error in homokinetics resulting from the misalignment of the axes can readily be calculated. To do that, consideration will be given to FIG. 3 which depicts a geometric construction associated with the set-up of FIG. 2, with respect to some arbitrary orthonormal axes, vertical Y and horizontal X.

The following conventions have been adopted:
M: a drive point (point of trapping between the jaws 2300 and 2310);
M°: projection of M onto the X-axis;
$O_s$: origin of the axis of rotation of the probe 12, that is to say of the vane 121;
$O_o$: origin of the axis of rotation of the tool 2 (that is to say of the moving pointer 22);
X': axis parallel to the X-axis and passing through AS;
P: projection of M onto X';
$\alpha_o$: the tooling angle with respect to X;
$\alpha_s$: the probe (vane 121) angle with respect to X;
d: distance separating M from the axis $\Delta_o$ of rotation of the tool 2; and
e: axial misalignment (distance between the axes X and X').

These various parameters are connected by the following relationships:

$$MM'=d\times\sin(a)=MP+PM'$$

$$O_oM'=O_sP=d\times\cos(\alpha_o)$$

$$MP=O_sP\times\tan(\alpha_s)=d\times\cos(\alpha_o)\times\tan(\alpha_s)$$

$$MP-PM'=e+d\times\cos(\alpha_o)\times\tan(\alpha_s)=d\times\sin(a), \text{ hence:}$$

$$\alpha_s=\arctan((d\times\sin(\alpha_o)-e)/(d\times\cos(\alpha_o)))$$

To give a more concrete example, if we consider a typical axial misalignment value, namely: e=0.6 mm and a distance d=50 mm which is also typical, relationship (1) enables the calculation of the maximum homokinetics error $\Delta\alpha=(\alpha_s-\alpha_o)$, namely. $\Delta\alpha=0.7$ degrees, which is generally unacceptable.

Experience bears out these calculations. It is found in practice that the device 2 according to the known art does not meet or meets only with difficulty a requirement for-precision, the zero point being badly defined.

Finally, certain parameters cannot be taken into consideration by this device. Specifically, the vane 121 of the weather vane 12 may experience deformation, either through impact or through erosion, or by thermal stresses. This deformation results in twisting and/or warping of this vane. The device 2 according to the known art does not allow this deformation to be detected. Only a human operator would be able to observe it visually, but this would then be in the case of deformation of very great amplitude. The device according to the known art therefore does not allow the compliance with the original shape to be checked.

The invention sets out to alleviate the drawbacks of the devices of the prior art, some of which have been recalled.

The invention set itself, as object, a device for the precise positioning of the vane of the weather vane which allows not only measurements of linearity under very good conditions of precision, but also measurement of the zero under these same conditions.

To do this, according to a first important feature, direct use is made of the axis of rotation of the incidence probe, rather than of some axis associated with the device, to act as a reference for the angular positioning of the vane. This axis acts as a reference both for initial positioning, that is to say for "zeroing" and for measuring subsequent angular displacements of the probe, for example in fixed increments.

These last operations make it possible to measure the linearity of the probe, in a way similar per se to the devices of the prior art.

According to a second important feature of the invention, a structure which "envelops" the vane of the weather vane, that is to say a structure which allows it to be trapped reversibly within an internal chamber, is provided.

This second feature has the additional advantage of making it possible to check the compliance with the original shape. Any twisting or warping of the vane makes it impossible for the structure to be fitted within the limit of machining tolerances thereon.

The "enveloping" structure may be produced in several alternative forms, which allows prismatic vane profiles and non-prismatic profiles to be accommodated with equal ease.

The invention therefore has as its main subject a device for the in situ angular positioning of an incidence probe of the type known as the weather vane type, equipped with a vane that can move about an axis of rotation, said incidence probe being arranged on a wall, said wall comprising temporary fixing means said device to said wall about said incidence probe, characterized in that the device comprises a first structure, known as an enveloping structure, equipped with an internal chamber in which said vane can be inserted and immobilized reversibly, it being possible for a structure, known as a fixed structure, to be secured to said wall by fixing members and by said temporary fixing means comprising a member able to move on said fixed structure, known as a driving member, a coupling member for coupling said moving driving member and said enveloping structure so as to position the latter and said vane in a determined angular position about said axis of rotation, and means of measuring said angular position, these means being secured to said enveloping structure, so as to obtain said angular positioning.

The invention will now be described in greater detail with reference to the appended drawings, among which:

FIG. 1 schematically illustrates an exemplary embodiment of an incidence probe for an airplane of the type comprising a weather vane that can move about an axis;

FIG. 2 schematically illustrates an exemplary embodiment of a device for the angular positioning of an incidence probe of the weather vane type according to the prior art;

FIGS. 4A to 4C illustrate a preferred exemplary embodiment of a structure known as a fixed structure according to one of the features of the invention, which is intended to be secured to the airplane during the phases of checking the incidence probe and comprising a member for driving the latter;

Figure 10:
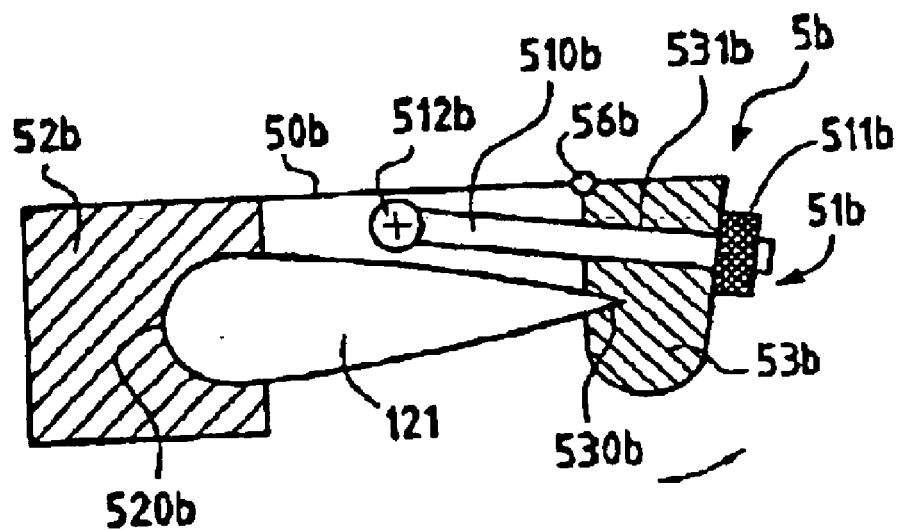
Figure 11:
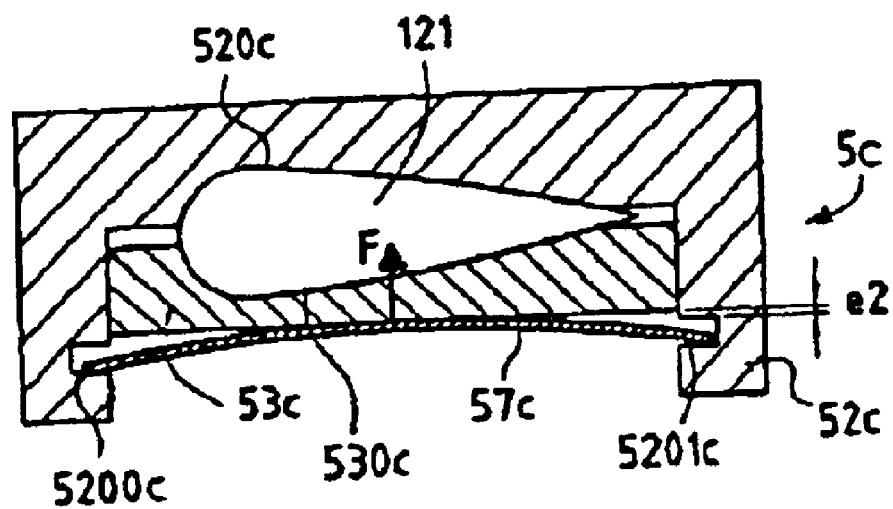

FIGS. 5A and 5B schematically illustrate a first exemplary embodiment of a structure known as an enveloping structure, in which the vane of the incidence probe is inserted and immobilized reversibly according to another feature of the invention;

FIGS. 6A to 6D illustrate a practical exemplary embodiment of a structure known as an enveloping structure according to a second embodiment;

FIG. 7 illustrates, in greater detail, an exemplary embodiment of a driving member coupling the fixed and enveloping structures;

FIG. 8 schematically illustrates a complete angular positioning device according to the invention and its operation;

FIG. 9 schematically illustrates an additional arrangement making it possible to define an absolute reference for the angular position of the incidence probe;

FIG. 10 schematically illustrates, in section, a third exemplary embodiment of a structure known as an enveloping structure; and FIG. 11 schematically illustrates, in section, a fourth exemplary embodiment of a structure known as an enveloping structure more particularly suited to a vane of non-prismatic shape.

A first exemplary embodiment of a device for the angular positioning of an incidence probe according to the invention will now be described in detail.

According to a first important feature of the invention, it is the axis of the incidence probe itself, that is to say the axis of rotation of the vane, which acts directly as a reference axis. In order to be able to be positioned angularly, the vane 121 (FIG. 1) of the weather vane 12 has thus to be driven in rotation about the axis of the probe $\Delta_s$. The angular positioning device according to the invention comprises a first member which will hereinafter be termed the angular driving member. The configuration of this member may be common to all the alternative forms of embodiment of the device according to the invention.

Figure 3:
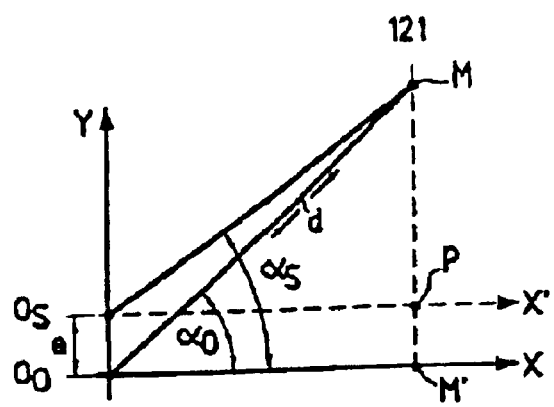
FIG. 3 is a geometric construction allowing the homokinetics error encountered in the device of FIG. 2 to be calculated.
Figure 4A:
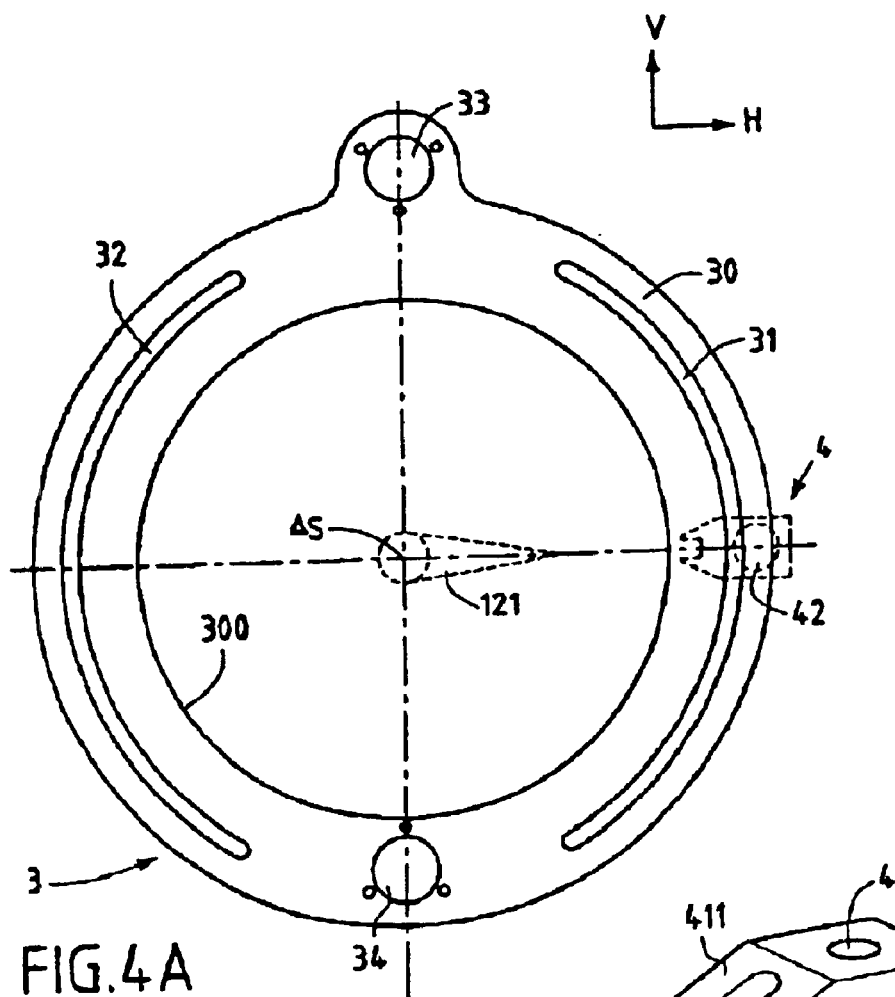

It comprises first of all a fixed structure 3, one exemplary embodiment of which is illustrated in FIG. 4A, in a view from above. The term "fixed" is to be understood as meaning that it can be secured temporarily to the airplane, for example by screwing, in a similar way to the device of the prior art in FIG. 1.

The fixed structure 3, in the example illustrated in FIG. 4A, has the overall shape of a ring 30 comprising two members 33 and 34 for fixing to the airplane. These fixing members are arranged parallel to an axis V that is assumed to be vertical, of a pair of orthonormal axes V and H, the latter axis being assumed to be horizontal. As previously, the airplane comprises fixing orifices (not depicted), that can be plugged up for normal use, and which are in register with the fixing members 33 and 34. The fixing orifices on the airplane are positioned spatially in such a way that the interior orifice 300 of the ring 30 is more or less centered on the axis $\Delta_s$ of the probe (FIG. 1:1), that is to say on the axis of rotation of the vane 121. As will be demonstrated hereinafter, this centering does not need to be very precise and even a relatively large misalignment does not detract from the quality of the positioning. The ring 30 finally comprises, on each side of the vertical axis connecting the two fixing members 33 and 34, two penetrating slots, 31 and 32, aligned on a circle the center of which is more or less coincident with the axis of symmetry of the ring and therefore also with the axis $\Delta_s$ when the structure 3 is secured to the airplane.

The slots 31 and 32 constitute guide rails for a slider 4, depicted in dotted line, which can move around the circumference of the ring 30. The amplitude of travel is limited by the length of the slots.

FIG. 4B shows the right-hand part (in FIG. 4A) of the ring 30, viewed from the side and in part section. This FIG. 4B illustrates in greater detail the slider 4 mounted on the ring 30. The slider 4 comprises a body in the shape of an inverted U 40 which can be slipped over the edge of the ring 30. The lower branch of the U comprises a housing for the head 420 of a screw 42 and the upper branch has an orifice through which the shank of the screw 42 can emerge. The latter passes through the slot 31. The body supports a part 41, itself provided with an orifice 410 into which the shank 421 of the screw 42 is inserted. Finally, a thumbwheel, screwed onto the threaded shank 421 of the screw 42 allows the carriage 4 to be kept secured to the ring 30. When the thumbwheel 43 is slackened, the carriage 4 can be moved by hand along the slot 31. The same would be true if the carriage had been caught on the slot 30. By contrast, when an operator (not depicted) screws the thumbwheel home, the part 41 is pressed firmly against the upper surface of the ring and/or the branches of the U trap the ring 30. It then follows that the slider 4 is immobilized in the position it has reached along the slot 31 (or 30).

Underneath the ring there are support structures, for example 340, which are pierced, for example 3400. These support structures are connected at the fixing members 33 and 34 so as to raise the structure 3 by a height h and give the slider 4 (the lower branch of the U 40) the possibility of moving along the slots 30 or 31.

Figure 4C:
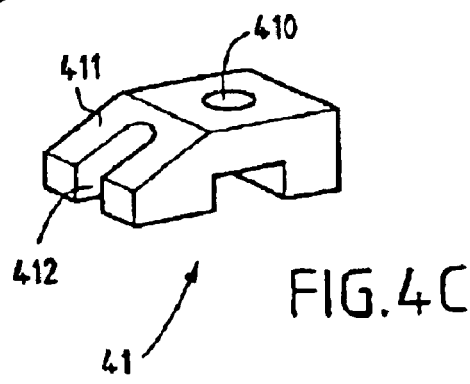

FIG. 4C illustrates the part 41 in greater detail. It comprises, on the side intended to face the inside of the ring 30, a face 411, beveled at the upper part. The latter comprises a longitudinal slit 412, also facing toward the inside of the ring 30. The usefulness of this slit will be specified hereinbelow.

To give a more concrete example, the structure 3 (ring 30 and slider 4) may be made of light metal, for example aluminum, except for the support structures 340 which may be made of plastic material (PVC for example) so as not to scratch the support surface of the structure.

Typically, the outside diameter of the ring 30 is 330 mm approximately, the inside diameter is 240 mm approximately, and the circle along which the slots run is approximately 300 mm. The angle subtended by these slots 31 and 32 is about 60 degrees ($\pm \alpha_M$).

The angular positioning device according to the invention comprises a second main part consisting of a structure which will be termed the enveloping structure that envelops the vane of the weather vane. This second structure can be embodied in various ways and in various alternative forms, in each of these embodiments, particularly to take account of the shape of the vane. What happens is that there are two main shapes of vane. The first is said to be prismatic and the second is said to be non-prismatic. The prismatic structure relates to a vane profile which can be slipped, by simple translation, into an orifice of matching shape. By way of nonlimiting example, the shape of the vane 121 depicted in FIG. 1 is a prismatic shape. A non-prismatic shape will entail that the enveloping structure, comprising a chamber of matching shape, have at least two parts which can be parted in order to allow the body of the vane to enter and can be closed back up in order to trap it.

A first example of a first embodiment will now be described with reference to FIGS. 5A and 5B which are suited to a prismatic shape of vane. This structure will be given the name "sock". FIG. 5A very schematically illustrates the enveloping structure 5 in perspective and FIG. 5B illustrates this same enveloping structure in section AA of FIG. 5A.

The enveloping structure 5 comprises a main body 50, of right-angled parallelepipedal shape in the example described. This body has an open longitudinal internal chamber 500. The shape of this chamber is such that it allows the vane 121 of the weather vane 12 to be inserted by translation along a longitudinal axis $\Delta_L$, with a very small clearance. It can therefore be maintained that the shape of the chamber 500 practically matches that of the vane 121. In one region, which will arbitrarily be termed the rear of the body 50, there is a screw-thumbwheel system 51 passing through the wall of the body 50 and of which the lower part 510, at the opposite end to the thumbwheel 511 (the latter being accessible from the outside) can rest against one of the edges of the vane 121, a priori the rear part 1210 of the vane 121, that is to say the most tapered part. When the screw-thumbwheel system 51 is tightened (see particularly FIG. 5B, section AA being taken on this system 51), the front part 1211 of the vane 121 is pressed against the corresponding internal wall of the cavity 500 and the vane 121 is immobilized in this cavity 500.

The angular positioning device according to the invention comprises a third main part, in this instance an apparatus for measuring the rotation of the vane 121 about the axis $\Delta_s$. Indeed it should be clearly understood that, unlike the device of the prior art (FIG. 2:2), the fixed structure (FIGS. 4A to 4C) comprises no means of measuring the rotation of the weather vane 12. As will be explained hereinafter, this structure will be used only to drive and immobilize the weather vane 121, via the aforementioned slider 4. According to one feature of the invention, the enveloping structure 5, which follows the rotational movements of the vane 121, supports apparatus for measuring the amplitude of these rotational movements.

Advantageously, to do this, use may be made of an inclinometer 6, secured to the body 50 of the structure 5. This apparatus then, at every moment, measures the inclination of the vane 121 with respect to a local horizontal plane. As a preference, use is made of an inclinometer of digital type which displays the results of the measurements on a screen 60, thus avoiding any error in interpretation on the part of an operator (parallax errors in particular in the case of an apparatus of analog type).

Advantageously also, the inclinometer 6 is not mounted fixedly on the structure 5. Thus, the risk of damaging the incidence probe 12 when slipping the enveloping structure 5 on is lower, the total weight and bulk of said enveloping structure 5 being reduced to a minimum. Once the operation has been completed, and the vane 121 has been immobilized inside the chamber by screwing (using the thumbwheel 511), the inclinometer 6 is coupled to the structure 5, for example inserting it in slideways provided for that purpose (not depicted in FIG. 5A).

A practical exemplary embodiment of an enveloping structure will now be described in greater detail, in an additional alternative form, with reference to FIGS. 6A to 6D. The letter "a" will be added to the various components of this additional embodiment.

FIG. 6A illustrates the enveloping structure 5a in the side view and FIG. 6B illustrates it in section BB of FIG. 6A.

As shown more particularly in FIG. 6B, the main body of the enveloping structure 5a comprises a first part 50a in the shape of an inverted U enclosing two superposed parts 52a and 53a. Each of these parts is equipped with a recessed cavity 520a and 530a respectively. The two cavities 520a and 530a are arranged opposite and facing each other, so as to define a chamber of matching shape to that of the vane 121, as before. These parts will preferably be made based on a non-abrasive material, so as not to risk damaging the vane 121, for example on a polyamide.

The U-shaped part 50a is secured to a lower support 54a. The relative thicknesses of the parts 520a and 530a are such that they leave the smallest possible clearance $e_1$ between the bottom of the U and the upper face of the part 52a.

The U-shaped part 50a comprises, on its upper part, a tapped orifice 500a so that a screw-thumbwheel system 51a, the lower part 511a of which presses against the upper part 52a, can be screwed in. Once the vane 121 has been introduced into the internal chamber, formed by the two cavities 520a and 530a, by longitudinal translation, the two parts 52a and 53a are tightened together using the thumbwheel 511a, so as to immobilize this vane inside the enveloping structure 5a.

FIG. 6A, in dotted line, depicts the vane 121 fully pushed into the enveloping structure 5a.

The parts 52a and 53a protrude on each side of the U-shaped part 50a precisely so as to envelop the vane 121 over most of its length. They advantageously have lower faces (for example 522a in the case of the, part 52a) and top surfaces (for example 521a in the case of the part 52a) which are flat and substantially orthogonal to the axis of rotation $\Delta_s$ of the vane 121. A stop 55a may be provided on the lower face, for example 522a. The latter presses on the rotating support 120 of the vane 121 and defines the maximum extent to which the enveloping structure 5a can be pushed in.

As shown more specifically in FIG. 6A, the support 54a of the components constituting the enveloping structure 5a is an elongate part arranged along an axis $\Delta_5$ substantially orthogonal to the axis $\Delta_s$.

Aside from the function of supporting the enveloping structure 5a, this part also has the function of supporting the inclinometer 6, illustrated in FIG. 6C. More specifically, the part 54a acts as a slideway for the reversible fixing of this inclinometer 6.

FIG. 6D illustrates the support 54a, in a side view, but from the opposite side to FIG. 6A. The body 540a is equipped with two lateral slideways 5400a and 5401a, intended to guide the body 61 of the inclinometer 6 (FIG. 6C). The latter comprises a shoe 66 (at the bottom of FIG. 6C) allowing it to be inserted between the two slideways 5400a and 5401a in the direction of the arrow f (from right to left in FIG. 6D). Advantageously, the slideways 5400a and 5401a are beveled at the front, 5402a and 5403a, to make the shoe 66 easier to insert. One of the ends (the left-hand end in the example) has a stud 63 intended to be inserted in an orifice 5406a (FIG. 6D) provided for that purpose on the corresponding end of the support 54a. The other end has a protrusion 64 (downwards in the example) intended to be inserted in a fork 5404a (FIG. 6D) provided at the corresponding end of the support 54a. These complementing parts are each equipped with a penetrating orifice orthogonal to the axis $\Delta_5$, 640 and 5405a, respectively.

A stud 65 which can be slipped into these orifices and attached, for example using a chain 67, to the body of the inclinometer 6 is provided. Once slipped onto its support 54a, the latter thus remains immobilized in this position.

As has been mentioned, the inclinometer 6 is preferably of digital type. It comprises, inside it, electronic circuits and a self-contained electric power supply (for example based on cells or batteries). On a side face, there is a display 60 and, in particular, an on/off switch 62.

The angular positioning device according to the invention finally comprises a fourth main part allowing the enveloping structure to be driven, for example in its version 5a, using the slider 4 (FIGS. 4A to 4C).

FIG. 7 illustrates in perspective an exemplary embodiment of a coupling member 7 allowing collaboration between the enveloping structure 5a (FIGS. 6A and 6B) and the slider 4.

The coupling member 7 comprises a first solid part 70. If we refer once again to FIG. 6A, this part is profiled in such a way that it has a flat wall able to be fixed by any appropriate means (screws etc.) to one of the side faces of the U-shaped part 500a, for example the right-hand face 500a, in the example described. The face that will be known as the lower face 701 of the part 70 is flat and makes an angle with the face 700 such that it is parallel to the axis $\Delta_5$.

Fixed to this lower face 701 is a long straight part 71 with elastic properties, advantageously consisting of a flat spring. Arranged at the free end is a vertical cylindrical stub 72. The length of the spring 71 and the diameter of the stub 72 are such that the latter can be inserted in the longitudinal slit 412 of the upper part 41 of the slider 4.

As this slit has a length l, the stub 72 will be able to run longitudinally inside this slit 412. Furthermore, because of the elastic properties of the spring 71, the stub 72 can run heightwise. There is no rigid coupling.

FIG. 8 schematically, in perspective, illustrates the interaction between the main components of the angular positioning device according to the invention and will allow its operation to be explained.

The ring-shaped fixed structure 3 is secured to the airplane, using screws or similar members 330 and 340, collaborating with tapped orifices 331 and 341 produced on the nacelle of the airplane $A_v$, as has been mentioned. In this configuration, the ring 30 surrounds the weather vane 12 and its vane 121 which alone protrudes from the wall of the airplane $A_v$. The enveloping structure 5a, depicted schematically in FIG. 8 as a right-angle parallelepiped, is slipped on. Once this operation has been completed, the vane is immobilized inside the structure 5a (using the thumbwheel 511a: FIG. 6B). The inclinometer 6, depicted schematically also as a right-angled parallelepiped is then fixed to the body of the enveloping structure 5a. The stub 72 is then introduced into the slit 412 of the part 41 of the slider 4. It is assumed, in the example illustrated, that the slider 4 is in the right-hand slot 31.

In this configuration, it is now possible for the enveloping structure 5a to be driven and therefore for the weather vane 12 to be turned about its axis of rotation $\Delta_s$, because the vane 121 is immobilized inside the structure 5a. The inclinometer 6 also follows these rotational movements because it is secured to the structure 5a and at every moment indicates the value of the angle of inclination of the whole with respect to a local horizontal plane (axis H).

However, to position the vane 121 (and therefore the probe) at an absolute initial value, this knowledge is not enough because it does not give the parameter known as the "airplane reference". The successive indications of the inclinometer 6, when the slider 4 is moved along the slot 31, on each side of the axis H, allow only relative measurements to be taken.

It is, however, possible to obtain an absolute initialization value, for example using one or other of the two methods below.

In a first method, if the airplane on-board instruments to which the probe 12 is connected (via the links 13: FIG. 1) so permit, the weather vane 12 is positioned at the reference angle of the airplane and the inclinometer 6 is zeroed in relative terms. Although not depicted in FIG. 6C, there is generally a member for setting the zero or for calibration. In the context of the invention, the zero will not necessarily correspond to the local horizontal (axis H).

After this initial setting, the angles read off the inclinometer 6 are real local angles of incidence, naturally precise to within the reference angle and to within the precision of the angle measured by the inclinometer 6.

In a second method which will be illustrated by reference to FIG. 9, a reference is created on the wall of the airplane during the first mounting of the incidence probe 1 (FIG. 1). The reference in question consists in an additional orifice machined into the wall of the airplane $A_v$. If reference is made once again to FIG. 6A, a collection 8 of parts known as locating pieces 80 and 81 respectively, equipped at their free ends with aligned holes 800 and 810, defining a reference axis $\Delta_{ref}$, are fixed to the upper and lower walls, for example 520a and 521a, of the structure 5a. By taking this drilling template it is possible to machine a precision hole $T_{ref}$ in the wall of the airplane $A_v$, aligned with the airplane reference. With this concrete reference, it becomes possible, during any subsequent checking of the incidence probe, to set the inclinometer zero accordingly by aligning the holes 800, 810 and $T_{ref}$.

In both instances, once the angular position has been initialized, a series of measurements are taken, like in the prior art, on each side of the point of the initial angular position, for example in angular increments of predetermined value (typically every 5 degrees). This series of measurements makes it possible to determine the linearity of the incidence probe. To do this, as also in the prior art, the value of the converted signals are read off an on-board instrument for each position imposed on the weather vane 12 via the slider 4 and the coupling member 7.

Usually, the maximum amplitude of rotation of the vane about its axis $\Delta_s$ is ±45 degrees. A length of slot, 31 or 32, is therefore provided that will allow an angular excursion ±α at least equal to this value, typically ±60 degrees on each side of the axis H (FIG. 8).

The device according to the invention also makes it possible to determine the compliance of the vane 121 by relying on the profile as a whole and not only by considering a point reference as was done in the prior art (FIG. 1: 2300–2301). Indeed, if reference is made once again particularly to FIG. 6B, it has been mentioned that there is only a small clearance, of amplitude $e_1$, between the complementing parts 52a and 53a. If the deformations of the vane exceed this clearance $e_1$, it will not be possible to insert it into the structure 5a.

In this way, compliance of the vane 121, typically of the order of 0.2 mm, can be guaranteed. That value typically corresponds to an angular error of the order of 0.1 degree, which is generally acceptable.

The embodiment of the "sock" type, illustrated in FIGS. 5A and 5B, also allows a compliance check.

Other embodiments are possible.

FIG. 10 illustrates, in section, an embodiment of an enveloping structure 5b comprising a body 50b consisting of two half-casings, 52b and 53b respectively. The first part 52b is fixed, and the second 53b is articulated about a rotation axle 56b. It can therefore move substantially away from the first part and allow the vane 121 to enter the enveloping structure 5b. As before, the two parts 52b and 53b are provided with hollow cavities 520b and 530b. However, these correspond only to the ends of the vane 121. Once the latter has been introduced into the structure 5b, the moving part 530b is pivoted about its axle 56b, and this has the effect of trapping the vane 121. To maintain this status, a screw-thumbwheel system 51b, comprising a screw body passing through the wall of the part 53b (passage 531b) and the end of which is secured to the fixed part 52b via a rotation axle 512b is provided. Once the vane has been introduced into the structure and the part 53b has been folded down, all that is required is for the assembly to be tightened using the thumbwheel 511b, to immobilize the vane 121 in this position.

Hitherto, "prismatic" vane shapes have been considered. We shall describe, by way of nonlimiting example, an exemplary embodiment allowing non-prismatic shapes to be accommodated.

FIG. 11 illustrates, in section, one such embodiment. The enveloping structure 5c will hereinafter been known by the name of "a pencil-box" style.

It comprises in particular a first part in the shape of an inverted U 52c equipped on its internal main face with a hollow cavity 520c. On its internal lateral faces it comprises, in a region which will be termed the lower region, two longitudinal slots 5200c and 5201c respectively. The structure 5c comprises a second part 53c intended to be inserted between the lateral walls of the part 52c. This part also has a hollow cavity 530c, facing toward the cavity 520c. The two cavities define a chamber of matching shape to that of the vane 121 when they are in the operational position. As this vane is assumed not to have a prismatic shape, it cannot be inserted in the aforementioned chamber by translation. First of all, the part 53c is moved sufficiently far away, the vane 121 is placed against the lower face of the part 52c, in the cavity 520c. Next, the part 53c is positioned against the lower face of the vane 121. The latter is therefore enclosed in the aforementioned chamber. To maintain this state, a plate 57c forming a flat spring, domed upward is slipped in so as to exert thrust F on the part 53c and therefore immobilize the vane inside the structure 5c. A clearance, here referenced $e_2$, may also be provided between the two parts of complementary profile 52c and 53c, more specifically, as shown by FIG. 11, between the upper wall of the longitudinal slots 5201 and 5202, and the lower wall of the part 53c. Because of the thrust exerted by the spring 57c and because of its non-prismatic shape, the vane cannot leave its case as long as said spring 57c remains in place.

Naturally, for all these additional embodiments, a coupling member, similar to the member 7 of FIG. 7, is provided, the member being suited to the external shape of the enveloping structures. The structure known as the fixed structure 3 can be used without modification for all the embodiments.

It will easily be appreciated, from reading the foregoing, that the invention clearly achieves the objectives it set itself. In particular it avoids any homokinetics error, because the axis of rotation of the probe is used as a reference. It makes it possible to obtain good precision, both in absolute terms and in relative terms. The fixing, of unknown precision, of the structure known as the fixed structure, no longer plays a predominant part in the precision on the measurements, because this structure does not directly involve in these: there is no scale of graduations on this structure as there was in the prior art. Its sole purpose is to drive the vane of the weather vane, via the moving of the slider, the coupling member and the enveloping structure immobilize the vane therewithin.

It also makes it possible to guarantee a certain degree of compliance of the vane. It is suited to numerous types and shapes of vane, including non-prismatic shapes. The elements of the device according to the invention do not need to resort to expensive manufacturing techniques.

The invention is not, however, restricted solely to the exemplary embodiments explicitly described, particularly with reference to FIGS. 4A to 11.

The numerical values have been given only as a guide. They essentially depend upon the intended precise application.

What is claimed is:

1. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber configured to reversibly immobilize said vane inserted therein;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning.

2. The device as claimed in claim 1, wherein said driving member comprises a slider configured to move circularly on said fixed structure.

3. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber in which said vane can be inserted and immobilized reversibly;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning, wherein said fixed structure includes a ring arranged concentrically with respect to said incidence probe, wherein said ring comprises at least penetrating slot portions situated on each side of an axis of symmetry, to define a circular track, wherein said driving member includes a slider configured to move along said circular track, and wherein said slider comprises an immobilizing member configured to immobilize said slider along said circular track.

4. The device is claimed in claim 3, wherein said immobilizing member comprises a screw-thumbwheel system for tightening, with a screw passing through said slot portions of the circular track to retain said slider along said ring.

5. The device as claimed in claim 3, wherein said driving member comprises a part equipped with a slit of a predetermined length facing toward a center of said ring, wherein said coupling member comprises a part configured to be secured to said first structure, a leaf equipped with a peg at its free end, wherein a position and a length of said leaf and dimensions of said peg are determined to allow it to be inserted into said slit, wherein a material of said leaf has elastic properties, to produce a non-rigid coupling between said first structure and said slider, and wherein said predetermined length of the slit allows said coupling some longitudinal play when said slider moves along said ring.

6. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber in which said vane can be inserted and immobilized reversibly;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning, wherein said means for measuring said angular position includes a digital inclinometer configured to measure inclination of said vane with respect to horizontal.

7. The device as claimed in claim 6, wherein said first structure comprises slideways and attachment members allowing said inclinometer to be mounted on and removed from said first structure so that said vane can be inserted into said first structure and immobilized in a position before said inclinometer is mounted on said first structure.

8. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber in which said vane can be inserted and immobilized reversibly;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning, wherein said vane has a prismatic shape, said first structure comprises at least a main body equipped with a penetrating chamber along a longitudinal axis, and said chamber has a shape matching a shape of said flag so that it can be inserted therein, over all or part of its length, by a translational movement parallel to the longitudinal axis.

9. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber in which said vane can be inserted and immobilized reversibly;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning, wherein said vane has a prismatic shape, said first structure comprises at least one main body in a shape of an inverted U secured to a support fixed to ends of branches of said inverted U, between the branches of which are inserted a first and a second part that complement each other, each being equipped with hollow cavities placed facing each other, to form a chamber of a shape matching a shape of said vane, so that it can be inserted therein, over all or part of its length, by a translational movement, and further comprising a tightening thumbwheel-screw member allowing said first and second parts to be pushed back toward said support and allowing said vane to be immobilized inside said first structure.

10. The device as claimed in claim 9, wherein said first and second parts allow a separation clearance of predetermined amplitude allowing said insertion only if said vane does not have any deformation exceeding said clearance, to check its shape with a predetermined precision.

11. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber in which said vane can be inserted and immobilized reversibly;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning, wherein said vane has a prismatic shape, said first structure comprises at least one main body including first and second parts each forming a half-casing, wherein the first part is fixed with respect to said first structure and the second part is configured to move in rotation about an axle, said first and second parts being equipped with recessed cavities placed facing each other to form a partial chamber of a shape matching a shape of opposite ends of said vane and so that it can be inserted therein, over all or part of its length, in a translational movement when said first and second parts are in an open position, and further comprising a thumbwheel-screw member allowing said first and second parts to be brought closer together by rotation about said axle to immobilize the vane inside said first structure.

12. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber in which said vane can be inserted and immobilized reversibly;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning, wherein said vane has a non-prismatic shape, said first structure comprises at least one main body including a U with an internal main face having a first recessed cavity and a second part arranged between branches of said U and equipped with a second recessed cavity facing toward said first cavity to form a chamber of a shape matching a shape of said vane when they are placed substantially one against the other and so that it can be inserted therein, over all or part of its length, when said first and second parts are moved apart, and wherein said first part is equipped with longitudinal slots along ends of said branches of the U, so that a spring leaf that exerts thrust toward said second part can be inserted, push it back toward said first part, and immobilize said vane inside said first structure.

13. The device as claimed in claim 12, wherein said first and second parts allow a separation clearance of predetermined amplitude allowing said insertion only if said vane does not have any deformation exceeding said clearance, to check its shape with a predetermined position.

14. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:

a first structure equipped with an internal chamber in which said vane can be inserted and immobilized reversibly;

a fixed structure configured to be secured to said wall by fixing members and by said temporary fixing means, comprising a driving member configured to move on said fixed structure;

a coupling member configured to couple said driving member and said first structure to position the first structure and said vane in a determined angular position about the axis of rotation; and means for measuring the angular position secured to the first structure, to obtain the angular positioning, wherein said first structure comprises a pair of parts equipped at their free ends with orifices defining a reference axis, wherein said wall comprises a reference orifice machined during initial fitting of said incidence probe, said orifices of said locating pieces and said reference orifice are brought into register to define an absolute initial position of said vane by calibrating said means for measuring said angular position.

15. A device for in situ angular positioning of an incidence probe, said incidence probe equipped with a vane configured to move about an axis of rotation and arranged on a wall, said wall including temporary fixing means for temporarily fixing said device to said wall about said incidence probe, comprising:
- a first structure equipped with an internal chamber configured to reversibly immobilize said vane inserted therein;
- a fixed structure configured to be secured to said wall by fixing members and by said temporary fixing means, comprising a driving member configured to move on said fixed structure;
- a coupling member configured to couple said driving member and said first structure to position the first structure and said vane in a determined angular position about the axis of rotation; and
- means for measuring the angular position secured to the first structure, to obtain the angular positioning, wherein said wall is an external wall of an aircraft.

16. A device for measuring in situ an angular position of an incidence probe provided on a wall, the incidence probe equipped with a vane configured to move about an axis of rotation, said device comprising:
- a first structure equipped with an internal chamber adapted to reversibly immobilize the vane inserted therein, said first structure being adapted to move about the axis of rotation;
- a fixed structure adapted to temporarily secure said device to the wall;
- a positioning member movably provided on said fixed structure;
- a coupling member coupling said positioning member and said first structure; and
- a device configured to measure an angular position of said first structure about the axis of rotation.

* * * * *